(12) United States Patent
Lee et al.

(10) Patent No.: US 9,625,748 B2
(45) Date of Patent: Apr. 18, 2017

(54) DISPLAY DEVICE

(71) Applicant: Samsung Display Co., Ltd., Yongin, Gyeonggi-Do (KR)

(72) Inventors: Chung Hui Lee, Cheongju-si (KR); Seung-Won Kuk, Asan-si (KR); Jee Su Park, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 115 days.

(21) Appl. No.: 14/271,725

(22) Filed: May 7, 2014

(65) Prior Publication Data
US 2015/0146403 A1   May 28, 2015

(30) Foreign Application Priority Data
Nov. 28, 2013 (KR) .................. 10-2013-0145938

(51) Int. Cl.
*G02F 1/1333* (2006.01)

(52) U.S. Cl.
CPC .................. *G02F 1/133308* (2013.01); *G02F 2001/13332* (2013.01)

(58) Field of Classification Search
CPC .................. G02F 1/133308; G02F 2001/13332
See application file for complete search history.

(56) References Cited

U.S. PATENT DOCUMENTS

| | | | |
|---|---|---|---|
| 5,640,272 A * | 6/1997 | Furuya .................. | G03B 21/10 348/E5.144 |
| 5,835,179 A * | 11/1998 | Yamanaka ............ | G02F 1/1335 349/161 |
| 7,050,127 B2 * | 5/2006 | Ishiwa ................. | G02F 1/13452 349/150 |
| 7,839,464 B2 * | 11/2010 | Lim .................... | H05K 7/20963 349/58 |
| 8,238,087 B2 | 8/2012 | McClure et al. | |
| 8,264,135 B2 | 9/2012 | Ozolins et al. | |
| 2007/0081344 A1 * | 4/2007 | Cappaert .............. | G02B 6/0085 362/373 |
| 2009/0256796 A1 * | 10/2009 | Jang .................. | G02F 1/133308 345/102 |
| 2010/0199536 A1 * | 8/2010 | Knight ................ | G09F 15/0018 40/606.01 |
| 2012/0044178 A1 * | 2/2012 | Song .................... | G06F 3/0412 345/173 |
| 2013/0010413 A1 | 1/2013 | Kim et al. | |
| 2013/0010497 A1 | 1/2013 | Lee et al. | |
| 2013/0027857 A1 | 1/2013 | Jeong | |
| 2013/0082988 A1 | 4/2013 | Lee et al. | |
| 2014/0063362 A1 * | 3/2014 | Di .......................... | G06F 1/182 349/12 |

(Continued)

FOREIGN PATENT DOCUMENTS

| JP | 04267096 A | * | 9/1992 |
| JP | 06265922 A | * | 9/1994 |

(Continued)

*Primary Examiner* — Zachary M Pape
*Assistant Examiner* — Douglas Burtner
(74) *Attorney, Agent, or Firm* — Innovation Counsel LLP (57) ABSTRACT

Provided is a display device capable of reducing a bezel space. The display device includes: a display panel; a lower chassis receiving the display panel; and a metal line fixed to one edge of the display panel and the lower chassis.

13 Claims, 11 Drawing Sheets

(56) References Cited

U.S. PATENT DOCUMENTS

| | | | | |
|---|---|---|---|---|
| 2014/0168534 A1* | 6/2014 | Hwang | ................ | G02F 1/1309 |
| | | | | 349/12 |
| 2015/0029688 A1* | 1/2015 | Fujita | .................. | H05K 5/0017 |
| | | | | 361/753 |
| 2015/0226997 A1* | 8/2015 | Tomomasa | ........ | G02F 1/133308 |
| | | | | 348/794 |

FOREIGN PATENT DOCUMENTS

| KR | 100889534 B1 | 3/2009 |
|---|---|---|
| KR | 20120004648 A | 1/2012 |
| KR | 20120077435 A | 7/2012 |
| KR | 1020120118372 A | 10/2012 |
| KR | 101225902 B1 | 1/2013 |
| KR | 1020130035094 A | 4/2013 |

\* cited by examiner

DISPLAY DEVICE

CROSS-REFERENCE TO RELATED APPLICATION

This application claims priority to and the benefit of Korean Patent Application No. 10-2013-0145938 filed in the Korean Intellectual Property Office on Nov. 28, 2013, the entire contents of which are incorporated herein by reference.

BACKGROUND (a) Technical Field

The present application relates to a display device, and more particularly, to a display device capable of reducing a bezel space.

(b) Description of the Related Art

Display devices are required for computer monitors, televisions, mobile phones, and the like which are widely used these days. The display devices include a cathode ray tube display device, a liquid crystal display, a plasma display device, and the like.

The liquid crystal display which is one of the most common types of flat panel displays currently in use, includes two sheets of display panels with field generating electrodes such as a pixel electrode, a common electrode, and the like, and a liquid crystal layer interposed therebetween. The liquid crystal display generates an electric field in the liquid crystal layer by applying a voltage to the field generating electrodes to determine alignment of liquid crystal molecules of the liquid crystal layer through the generated electric field and control polarization of incident light, thereby displaying images.

Since the liquid crystal display does not self-emit light, the liquid crystal display requires a light source. In this case, the light source may be an artificial light source which is separately provided or natural light. The artificial light source used in the liquid crystal display includes a light emitting diode (LED), a cold cathode fluorescent lamp (CCFL), an external electrode fluorescent lamp (EEFL), and the like.

A light guide plate (LGP) is required so that light emitted from the artificial light source has uniform luminance on the entire display panel.

The liquid crystal display includes a lower chassis receiving constituent elements such as a display panel, a light source, and a light guide plate. In manufacturing and transporting processes of the liquid crystal display, the constituent elements need to be fixed to the lower chassis in order to prevent the constituent elements from being separated or damaged. Accordingly, an upper chassis fixed to the lower chassis while covering the edge of the upper surface of the display panel is further formed. In this case, the upper chassis covers an edge of the upper surface of the display panel, and as a result, there is a problem in that a bezel space is increased.

The above information disclosed in this Background section is only for enhancement of understanding of the background and therefore it may contain information that does not form the prior art that is already known in this country to a person of ordinary skill in the art.

SUMMARY

Embodiments have been made in an effort to provide a display device having advantages of reducing a bezel space which is a non-display area of a screen.

An exemplary embodiment provides a display device, including: a display panel; a lower chassis receiving the display panel; and a metal line fixed to one edge of the display panel and the lower chassis.

The display device may further include a first fixing member covering the metal line positioned at the one edge of the display panel.

The first fixing member may be made of an adhesive material.

The first fixing member may be made of black silicon.

The display device may further include a second fixing member connected with an end of the metal line.

The second fixing member may comprise a screw.

The second fixing member may include a screw body having threads, a screw head having a larger radius than the screw body, and a hole passing through the screw body.

The metal line may be in the hole of the second fixing member.

The display device may further include a fastening member extending from the metal line at the end of the metal line.

The fastening member may have a larger radius than the hole.

The second fixing member may be fixed to a lower surface of the lower chassis.

The metal line may be wound on the screw body.

The display panel may include a first substrate and a second substrate facing each other, and the second substrate may have a larger width than the first substrate.

The first fixing member may cover a lower surface of the second substrate and a side of the first substrate.

A plurality of the metal lines may be fixed to both edges of the display panel facing each other.

The display device may further include a plurality of second fixing members connected to both ends of the metal line, respectively.

The display device may further include a mold frame covering the side of the lower chassis and supporting the display panel, in which the metal line may pass through the side of the mold frame.

The display device may further include a third fixing member having an end of the metal line therein.

The third fixing member may comprise an L-lettered bracket.

The display device may further include a fourth fixing member fixing the third fixing member to the lower chassis, in which the fourth fixing member may comprise a screw.

As described above, the display device according to the exemplary embodiments have the following effects.

In the display device according to the exemplary embodiment, it is possible to reduce a bezel space by fixing a display panel and a lower chassis by using a metal line.

DETAILED DESCRIPTION OF THE EMBODIMENTS

The inventive concept will be described more fully hereinafter with reference to the accompanying drawings, in which exemplary embodiments are shown. As those skilled in the art would realize, the described embodiments may be modified in various different ways, all without departing from the spirit or scope of the inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

First, a display device according to an exemplary embodiment will be described below with reference to FIGS. 1 and 2.

Figure 1:
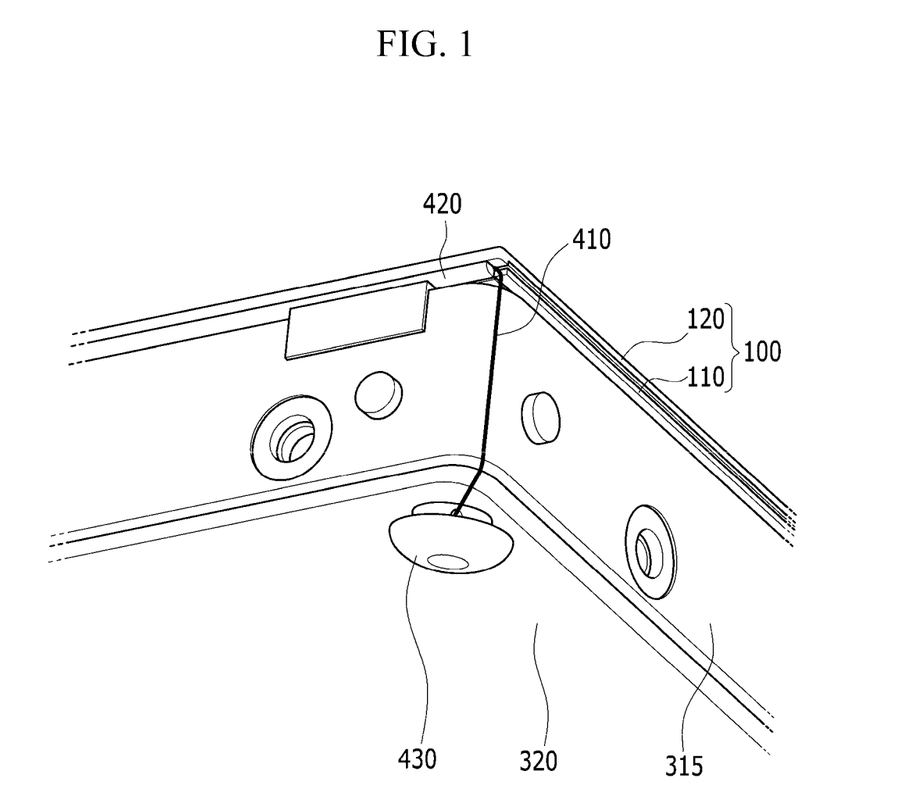
FIG. 1 is a perspective view illustrating a display device according to an exemplary embodiment.
Figure 2:
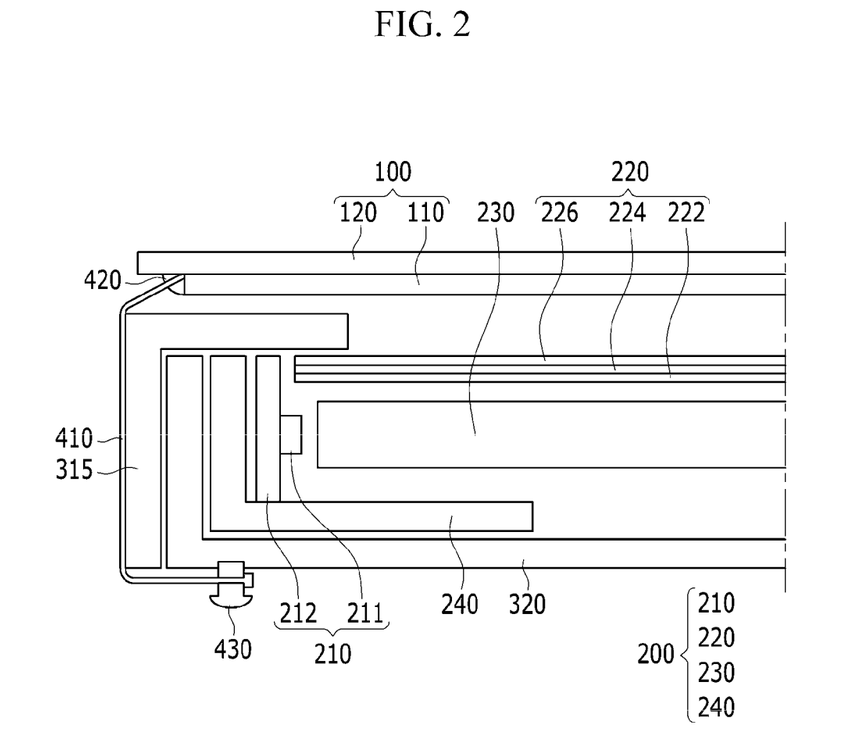
FIG. 2 is a cross-sectional view illustrating the display device according to the exemplary embodiment.

FIG. 1 is a perspective view illustrating a display device according to an exemplary embodiment, and FIG. 2 is a cross-sectional view illustrating the display device according to the exemplary embodiment.

The display device according to the exemplary embodiment is largely configured by a display panel 100 displaying an image, and a backlight assembly 200 supplying light to the display panel 100. Further, a lower chassis 320 for receiving the display panel 100 and the backlight assembly 200 is formed, and a metal line 410 is fixed to one edge of the display panel 100 and the lower chassis 320.

The display panel 100 may be configured by a liquid crystal display panel (LCD), and is not limited thereto, and may use various display panels such as an electrophoretic display panel (EDP).

When the liquid crystal display panel is used as the display panel 100, the display panel 100 is formed by facing and bonding a first substrate 110 and a second substrate 120, and a liquid crystal layer (not illustrated) is formed between the first substrate 110 and the second substrate 120. Although not illustrated, a plurality of gate lines and data lines, and thin film transistors connected thereto are formed on the first substrate 110. Further, when the thin film transistor is turned on by a signal applied from the gate line, a pixel electrode to which the signal is applied from the data line is formed. A common electrode may be formed on the first substrate 110 or the second substrate 120, and an electric field is formed between the pixel electrode and the common electrode to control alignment of liquid crystal molecules of the liquid crystal layer. Accordingly, light input from the backlight assembly 200 is controlled to display the image.

The backlight assembly 200 includes a light source unit 210 supplying light, a light guide plate 230 guiding the light emitted from the light source unit 210 to the display panel 100, and an optical sheet 220 disposed on the light guide plate 230.

The light source unit 210 is disposed below one edge of the display panel 100, and includes a light source 211 generating light, and a circuit board 212 on which the light source 211 is mounted.

The light source 211 may be configured by a plurality of emission members, and the emission member may be configured by, for example, a light emitting diode (LED) and the like.

The circuit board 212 is electrically connected with the light source 211 to supply a signal driving the light source 211 to the light source 211.

The light source unit 210 generates heat when generating light, and an extrusion bar 240 adjacent to the light source unit 210 for heat dissipation may be formed. The extrusion bar 240 may be made of a material having high heat dissipation performance, such as aluminum.

The light guide plate 230 is disposed to be adjacent to the light source unit 210. The light emitted from the light source unit 210 is incident to the side of the light guide plate 230 to be emitted to the upper surface. In this case, the light guide plate 230 may allow the incident light to be uniformly emitted entirely to the upper surface.

The optical sheet 220 increases collection efficiency of the light emitted from the light source unit 210 and allows the light to have an entirely uniform distribution. The optical sheet 220 may be configured by a plurality of various sheets, and for example, includes a diffuser sheet 222, a prism sheet 224, and a protecting sheet 226 which are sequentially laminated.

The diffuser sheet 222 diffuses the light emitted from the light source unit 210. The prism sheet 224 collects the light diffused from the diffuser sheet 222 in a direction vertical to the plane of the display panel 100. The light passing through the prism sheet 224 is almost vertically incident to the display panel 100. Further, the protecting sheet 226 may be disposed on the prism sheet 224 and protects the prism sheet 224 from external impact.

Hereinabove, the optical sheet 220 in which the diffuser sheet 222, the prism sheet 224, and the protecting sheet 226 are included one by one is exemplified, but the embodiments are not limited thereto. As the optical sheet 220, at least one of the diffuser sheet 222, the prism sheet 224, and the protecting sheet 226 may be used while a plurality of sheets is stacked, and if necessary, any one sheet may be omitted.

The lower chassis 320 may be configured by a bottom and sides which are extended from the bottom and curved. The display panel 100 and the backlight assembly 200 may be received inside the lower chassis 320. The lower chassis 320 may be made of a material having high stiffness so as to protect the display panel 100 and the backlight assembly 200 from external impact.

A mold frame 315 for fixing the display panel 100 and the backlight assembly 200 may be further formed. The mold frame 315 is formed to cover the side of the lower chassis 320, and extended and curved from the side to cover the upper surface of the backlight assembly 200. The display panel 100 is positioned on the mold frame 315.

A part of the metal line 410 is fixed to the display panel 100, and the other part is fixed to the lower chassis 320. Accordingly, the display panel 100 is fixed to the lower chassis 320 by the metal line 410. In the related art, a separate upper chassis is used in order to fix a display panel to a lower chassis, and as a result, there is a limit in reducing a bezel area as the edge of the upper surface of the display panel is covered. In the exemplary embodiment, the display panel 100 is fixed to the lower chassis 320 without the upper chassis, thereby reducing the bezel area.

A first fixing member 420 is formed so that a part of the metal line 410 may be fixed to one edge of the display panel 100. The first fixing member 420 is formed to cover the metal line 410 positioned at one edge of the display panel 100. The first fixing member 420 is made of an adhesive material so that the metal line 410 may be fixed to the display panel 100. For example, the first fixing member 420 may be made of silicon, and particularly, black silicon. The light supplied from the backlight assembly 200 passes through the edge of the display panel 100 to be recognized as light leakage. In this case, the first fixing member 420 is black to prevent the light leakage from being recognized.

A second fixing member 430 is formed so that the other part of the metal line 410 may be fixed to the lower chassis 320. The second fixing member 430 is connected with an end of the metal line 410. The second fixing member 430 may be formed by a screw, and the second fixing member 430 may be inserted and fixed in the lower chassis 320. That is, the metal line 410 is fixed to the second fixing member 430, and the second fixing member 430 is fixed to the lower chassis 320. In this case, the second fixing member 430 may be fixed to the lower surface of the lower chassis 320.

The metal line 410 between a portion fixed to the display panel 100 and a portion fixed to the lower chassis 320 is disposed along the side of the mold frame 315. Although not illustrated, a groove corresponding to a portion through which the metal line 410 passes may be formed in the mold frame 315. In this case, the metal line 410 may be positioned in the groove of the mold frame 315, thereby improving fixing force of the metal line 410 and reducing an area where the metal line 410 contacts the outside to reduce impact from the outside.

Next, a method of fixing the metal line to the display panel and the lower chassis in the display device according to the exemplary embodiment will be further described below with reference to FIGS. 3 to 7.

Figure 3:
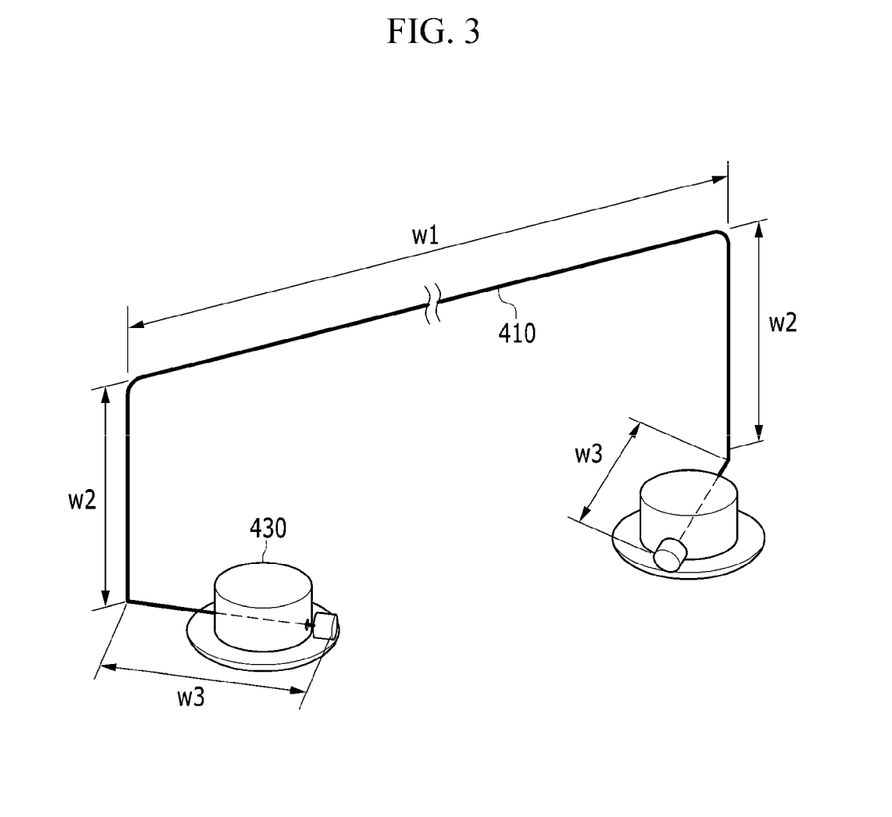
FIG. 3 is a diagram illustrating a metal line and a second fixing member of the display device according to the exemplary embodiment.
Figure 4:
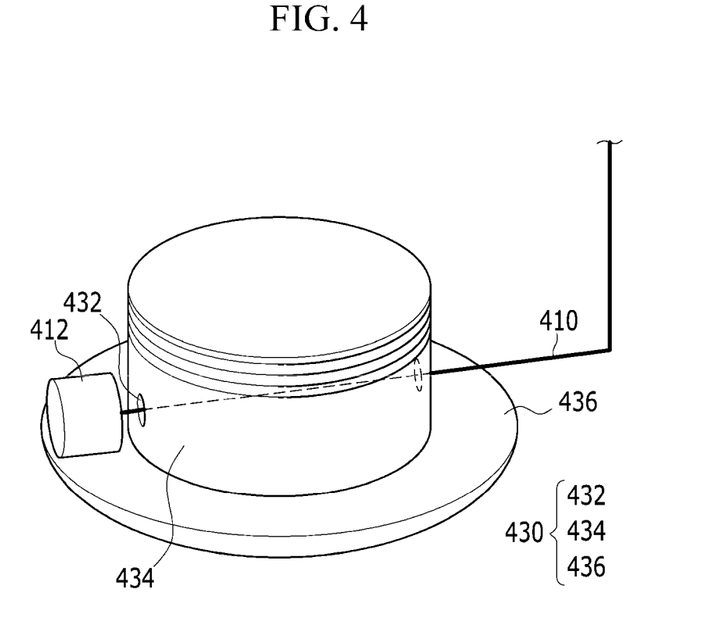
FIGS. 4 and 5 are diagrams enlarging a part of FIG. 3.
Figure 5:
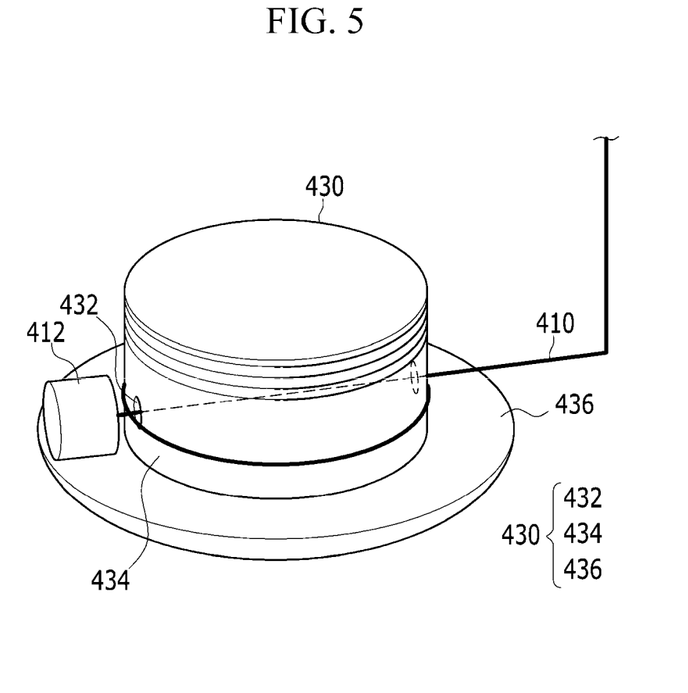
Figure 6:
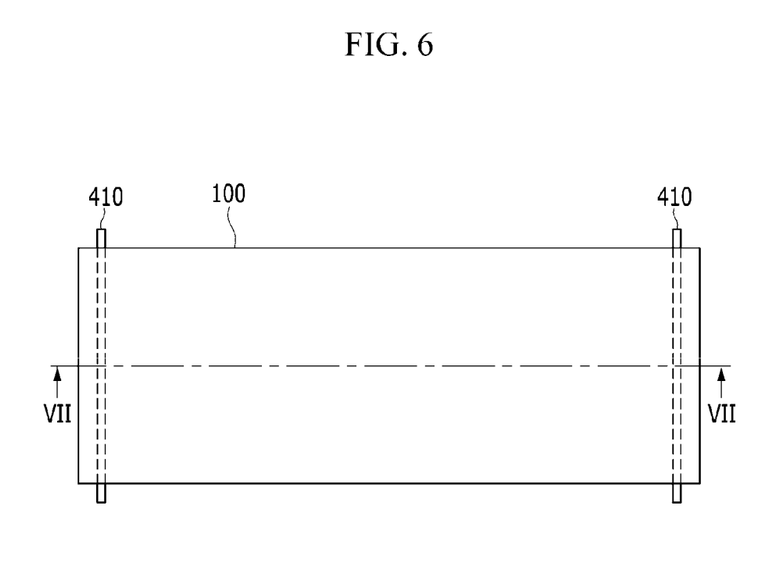
FIG. 6 is a plan view illustrating a display panel and a metal line of a display device according to an exemplary embodiment.
Figure 7:
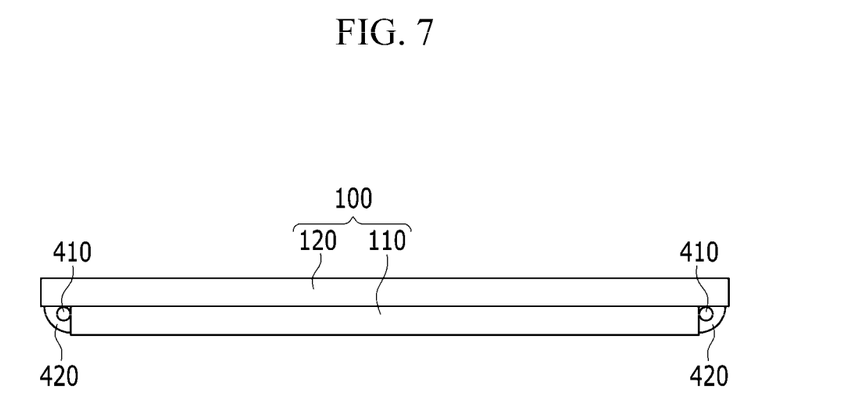
FIG. 7 is a cross-sectional view illustrating a display panel and a metal line of a display device according to an exemplary embodiment.

FIG. 3 is a diagram illustrating a metal line and a second fixing member of the display device according to the exemplary embodiment, and FIGS. 4 and 5 are diagrams enlarging a part of FIG. 3. FIG. 4 is a diagram enlarging a connection portion of the metal line and the second fixing member, and FIG. 5 is a diagram illustrating a form where the metal line is wound on the second fixing member in FIG. 4. FIG. 6 is a plan view illustrating a display panel and a metal line of a display device according to an exemplary embodiment, and FIG. 7 is a cross-sectional view illustrating a display panel and a metal line of a display device according to an exemplary embodiment.

The metal line 410 is configured by a line made of a metal material having a predetermined radius, and made of a material which is bent well and has high stiffness. The metal line 410 includes a first portion w1 fixed to the display panel 100, a second portion w2 extended from the first portion w1, and a third portion w3 extended from the second portion w2 to be connected with the second fixing member 430, as illustrated in FIG. 3.

The first portion w1 of the metal line 410 has substantially the same length as the length of one edge of the display panel 100. A color of the first portion w1 is different from colors of the other portions w2 and w3, and as a result, when the metal line 401 is fixed to the display panel 100, arrangement may be facilitated. For example, the first portion w1 is black, and the second portion w2 and the third portion w3 may be blue.

The second portion w2 of the metal line 410 has substantially the same length as the height of the side of the mold frame 315. The second portion w2 may be curved from the first portion w1. In this case, the first portion w1 and the second portion w2 may form an angle of about 90°. The second portion w2 may be formed to be extended from both ends of the first portion w1.

The third portion w3 of the metal line 410 is inserted into the second fixing member 430. The third portion w3 may be curved from the second portion w2. In this case, the second portion w2 and the third portion w3 may form an angle of about 90°. The third portion w3 may be formed to be extended from the two second portions w2 which are extended from both ends of the first portion w1, respectively. Accordingly, two second fixing members 430 may be connected to one metal line 410. That is, the two second fixing members 430 may be connected to both ends of the metal line 410, respectively. Further, the embodiments are not limited thereto, and three or more second fixing members 430 may be connected to the metal line 410. For example, two second fixing members 430 may be connected to one end of the metal line 410, and two second fixing members 430 may be connected to the other end of the metal line 410.

Referring to FIG. 4, the second fixing member 430 includes a screw body 434 and a screw head 436. The screw body 434 is formed in a cylindrical shape, and threads are formed at the outer side thereof. The screw head 436 has a larger radius than the screw body 434. The screw head 436 is illustrated as a cut spherical shape, but is not limited thereto, and may have various shapes such as a cylindrical shape.

The second fixing member 430 further includes a hole 432 passing through the screw body 434. A radius of the hole 432 is larger than a radius of the metal line 410. The metal line 410 is inserted into the hole 432. A fastening member 412 extended from the metal line is further formed at the end of the metal line 410.

The fastening member 412 may be made of the same material as the metal line 410. The fastening member 412 may be formed by heat-fusing the end of the metal line 410 after inserting the metal line 410 into the hole 432 of the second fixing member 430. The fastening member 412 is formed to have a radius larger than the radius of the hole 432 so as not to get out the hole 432. The fastening member 412 is formed to be fastened to the hole 432, and as a result, the metal line 410 may be fixed to the second fixing member 430. Stated another way, the radius of the fastening member 412 is larger than the radius of the hole 432 such that the fastening member 412 abuts and is fixed in place by the screw body 434 instead of passing through the hole 432 of the screw body 434.

In order to fix the second fixing member 430 to the lower chassis 320, the second fixing member 430 is turned to be inserted into the lower chassis 320 along the threads. Referring to FIG. 5, the metal line 410 is wound around the screw body 434 of the second fixing member 430 by turning the second fixing member 430. As the metal line 410 is wound on the second fixing member 430, tension of the metal line 410 occurs, and as a result, the display panel 100 is fixed to the lower chassis 320.

Referring to FIGS. 6 and 7, the display panel 100 includes the first substrate 110 and the second substrate 120, and the first substrate 110 and the second substrate 120 have different widths. In this case, the second substrate 120 positioned above may have a larger width than the first substrate 110 positioned below. An edge of the lower surface of the second substrate 120 is exposed due to a difference in width. The metal line 410 is positioned at a portion where the exposed lower surface of the second substrate 120 and the side of the first substrate 110 contact each other. Further, the first fixing member 420 is formed to cover the metal line 410, and the first fixing member 420 is formed to cover the lower surface of the second substrate 120 and the side of the first substrate 110.

The display panel 100 may have a quadrangular shape, and two metal lines 410 may be fixed to both edges of the display panel 100 facing each other. The metal line 410 is positioned at a short side of a long side and the short side of the display panel 100, but the embodiments are not limited thereto, and the metal line 410 may be positioned at the long side of the display panel 100. Further, three or more metal lines 410 may be fixed to the display panel 100. For example, all four metal lines 410 may be fixed to four edges of the display panel 100.

Next, a display device according to an exemplary embodiment will be described below with reference to FIGS. 8 to 11.

Since a display device according to an exemplary embodiment illustrated in FIGS. 8 to 11 is almost the same as the display device according to the exemplary embodiment illustrated in FIGS. 1 to 7, the description thereof is omitted. The exemplary embodiment is different from the above exemplary embodiment in a method of fixing the metal line to the lower chassis, and hereinafter, the method will be described in more detail.

Figure 8:
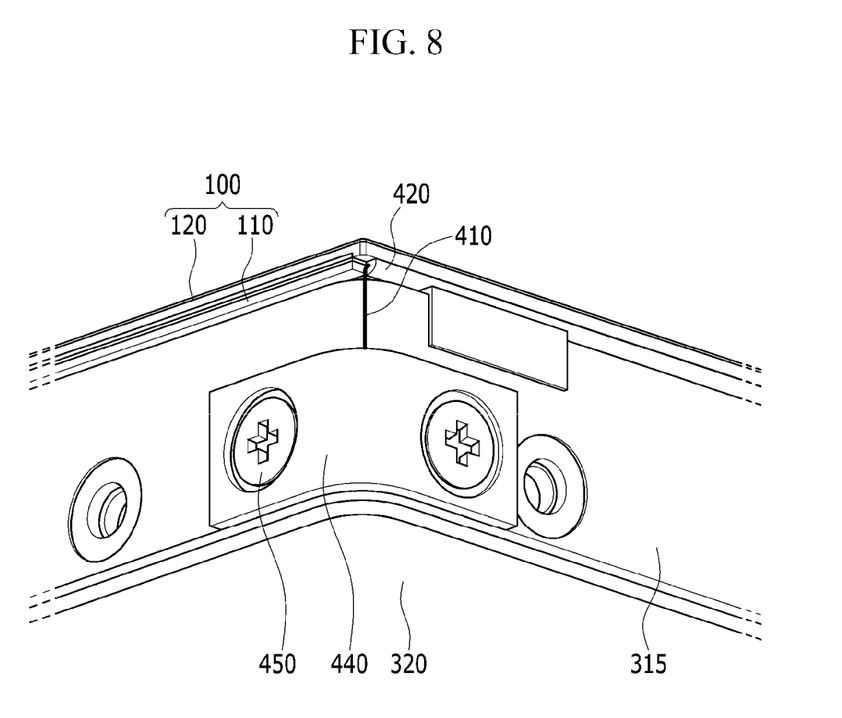
FIG. 8 is a perspective view illustrating a display device according to an exemplary embodiment.
Figure 9:
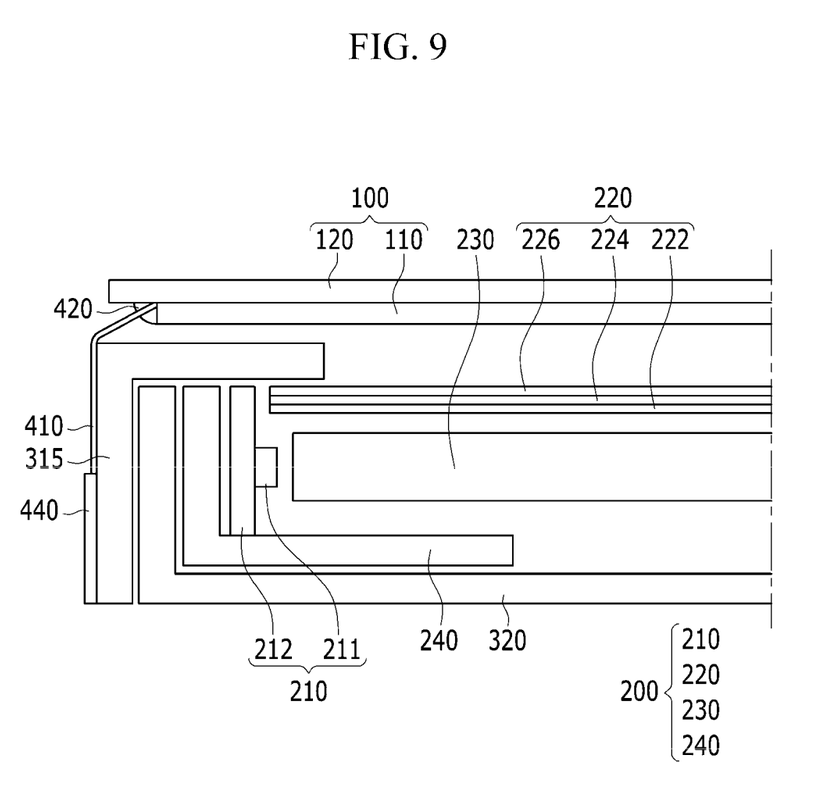
FIGS. 9 and 10 are cross-sectional views illustrating a display device according to an exemplary embodiment.
Figure 10:
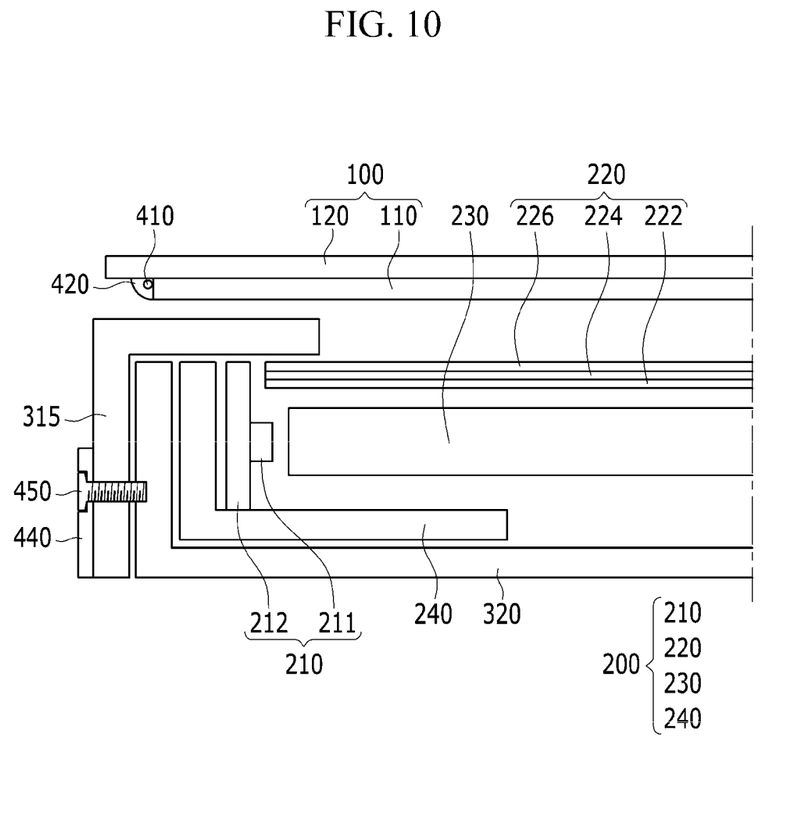
Figure 11:
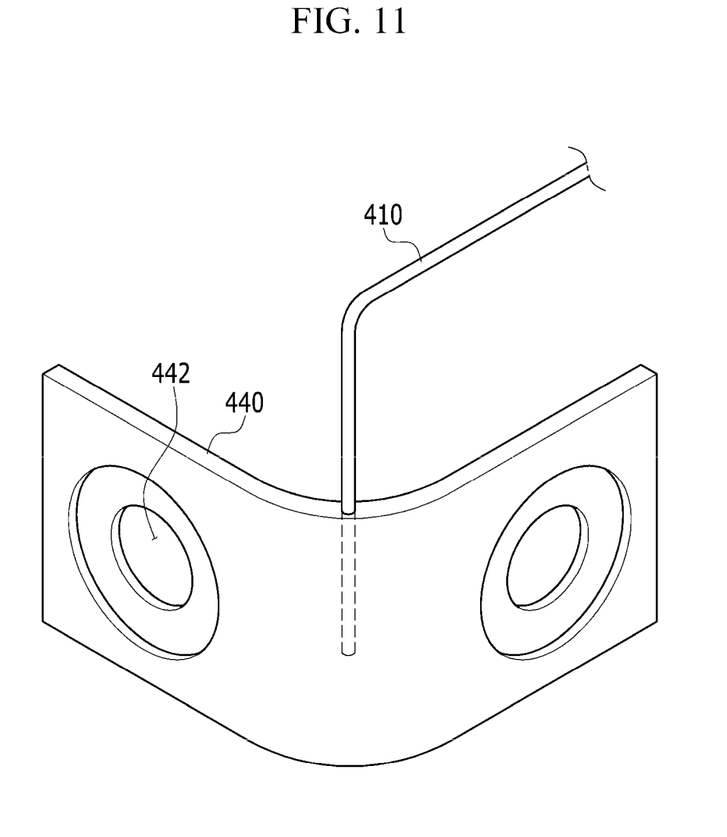
FIG. 11 is a diagram illustrating a metal line and a third fixing member of the display device according to the exemplary embodiment.

FIG. 8 is a perspective view illustrating a display device according to an exemplary embodiment, FIGS. 9 and 10 are cross-sectional views illustrating a display device according to an exemplary embodiment, and FIG. 11 is a diagram illustrating a metal line and a third fixing member of the display device according to the exemplary embodiment. FIG. 9 is cross-sectional view illustrating a portion where the metal line and the third fixing member are connected to each other, and FIG. 10 is a cross-sectional view illustrating a portion where the third fixing member is fixed to the lower chassis by a fourth fixing member.

The display device according to the exemplary embodiment is configured by a display panel 100 displaying an image, and a backlight assembly 200 supplying light to the display panel 100. Further, a lower chassis 320 for receiving the display panel 100 and the backlight assembly 200 is formed, and a metal line 410 is fixed to one edge of the display panel 100 and the lower chassis 320.

The first fixing member 420 is formed so that a part of the metal line 410 may be fixed to one edge of the display panel 100, and a third fixing member 440 is formed so that the other part of the metal line 410 may be fixed to the lower chassis 320.

The third fixing member 440 is connected with an end of the metal line 410. The third fixing member 440 may be formed in an L-lettered bracket, and the third fixing member 440 may be fixed to the lower chassis 320 by the fourth fixing member 450. That is, the metal line 410 is fixed to the third fixing member 440, and the third fixing member 440 is fixed to the lower chassis 320. In this case, the third fixing member 440 may be fixed to the side of the lower chassis 320.

The end of the metal line 410 is inserted into the third fixing member 440. The third fixing member 440 may be formed by an injection molding method, and the end of the metal line 410 may be inserted into the third fixing member 440 in advance when performing the injection molding. Accordingly, the metal line 410 may be fixed to the third fixing member 440 after the injection molding.

The third fixing member 440 is curved in an L-lettered shape, and coupled with a curved portion of the side of the lower chassis 320. In this case, a mold frame 315 may exist between the lower chassis 320 and the third fixing member 440. The mold frame 315 is formed to cover the side of the lower chassis 320, and the third fixing member 440 is formed to cover the side of the mold frame 315.

A hole 442 is formed in the third fixing member 440. Further, the fourth fixing member 450 passing through the hole 442 of the third fixing member 440 and fixed to the mold frame 315 and the lower chassis 320 is formed. The fourth fixing member 450 is formed by a screw. The third fixing member 440 is curved in an L-lettered shape to have two sides. The holes 442 are formed in the two sides, respectively, and the third fixing member 440 may be fixed to the lower chassis 320 by two fourth fixing members 450. The embodiments are not limited thereto, and the third fixing member 440 may be fixed to the lower chassis 320 by three or more fourth fixing members 450.

The display panel 100 may have a quadrangular shape, and two metal lines 410 may be fixed to both edges of the display panel 100 facing each other. The third fixing member 440 is connected to both ends of each metal line 410 to form four third fixing members 440. Four third fixing members 440 may be connected to edge portions to which four sides of the lower chassis 320 are connected, respectively.

While the inventive concept has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

<Description of symbols>

| | |
|---|---|
| 100: Display panel | 110: First substrate |
| 120: Second substrate | 200: Backlight assembly |
| 210: Light source unit | 211: Light source |
| 212: Circuit board | 220: Optical sheet |
| 222: Diffuser sheet | 224: Prism sheet |
| 226: Protecting sheet | 230: Light guide plate |
| 240: Extrusion bar | 315: Mold frame |
| 320: Lower chassis | 410: Metal line |
| 412: Fastening member | 420: First fixing member |
| 430: Second fixing member | 432: Hole of second fixing member |
| 434: Screw body | 436: Screw head |
| 440: Third fixing member | 442: Hole of third fixing member |
| 450: Fourth fixing member | |

What is claimed is:

1. A display device, comprising:

a display panel;

a backlight assembly disposed under the display panel;

a lower chassis receiving the display panel;

a metal line fixed to one edge of the display panel and fixed to the lower chassis;

a first fixing member covering a portion of the metal line positioned at the one edge of the display panel; and a second fixing member connected with an end of the metal line, wherein the display panel includes a first substrate and a second substrate facing each other, the first substrate is disposed between the second substrate and the backlight assembly, and the second substrate has a larger width than the first substrate, and wherein the first fixing member covers a lower surface of the second substrate and a side surface of the first substrate.

2. The display device of claim 1, wherein:
the first fixing member is made of an adhesive material.

3. The display device of claim 2, wherein:
the first fixing member is made of black silicon.

4. The display device of claim 1, wherein:
the second fixing member comprises a screw.

5. The display device of claim 4, wherein:
the second fixing member includes:
a screw body having threads;
a screw head having a larger radius than the screw body; and
a hole passing through the screw body.

6. The display device of claim 5, wherein:
the metal line is in the hole of the second fixing member.

7. The display device of claim 6, further comprising:
a fastening member extending from the metal line at the end of the metal line.

8. The display device of claim 7, wherein:
the fastening member has a larger radius than the hole.

9. The display device of claim 5, wherein:
the second fixing member is fixed to a lower surface of the lower chassis.

10. The display device of claim 9, wherein:
the metal line is wound on the screw body.

11. The display device of claim 1, wherein:
a plurality of metal lines is fixed to edges of the display panel facing each other.

12. The display device of claim 11, further comprising:
a plurality of second fixing members connected to ends of the metal line, respectively.

13. The display device of claim 1, further comprising:
a mold frame covering the side of the lower chassis and supporting the display panel,
wherein the metal line passes through the side of the mold frame.

* * * * *